United States Patent [19]
Tanaka

[11] Patent Number: 4,894,672
[45] Date of Patent: Jan. 16, 1990

[54] CAMERA HAVING FOCAL LENGTH ADJUSTING LENS

[75] Inventor: Hitoshi Tanaka, Tokyo, Japan

[73] Assignee: Asahi Kogaku Kogyo K.K., Tokyo, Japan

[21] Appl. No.: 285,066

[22] Filed: Dec. 16, 1988

[30] Foreign Application Priority Data

Dec. 18, 1987 [JP] Japan .................................. 62-320838

[51] Int. Cl.⁴ ............................................... G03B 3/10
[52] U.S. Cl. ............................................. 354/195.12
[58] Field of Search ................................... 354/195.12

[56] References Cited

U.S. PATENT DOCUMENTS 4,277,158  7/1981  Zawodny ........................ 354/195.12
4,792,822  12/1988  Akuyama et al. .......... 354/195.12 X Primary Examiner—Michael L. Gellner
Attorney, Agent, or Firm—Sandler & Greenblum

[57] ABSTRACT

A camera having a focus adjusting lens assembly, including a camera body, a lens barrel movable in the optical axis direction with respect to the camera body, a first variable power lens group which is supported to move in the optical axis direction with respect to the lens barrel, a second variable power lens group integrally connected to the lens barrel so as to move therewith, pantograph linkages which contractibly connect the camera body and the lens barrel to vary the distance therebetween, and an actuator for moving the first power lens group to a predetermined position in the lens barrel in accordance with the deformation of the pantograph.

22 Claims, 4 Drawing Sheets

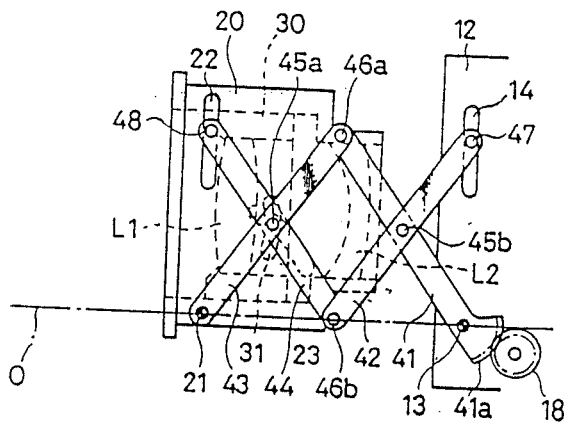
_Fig-4_
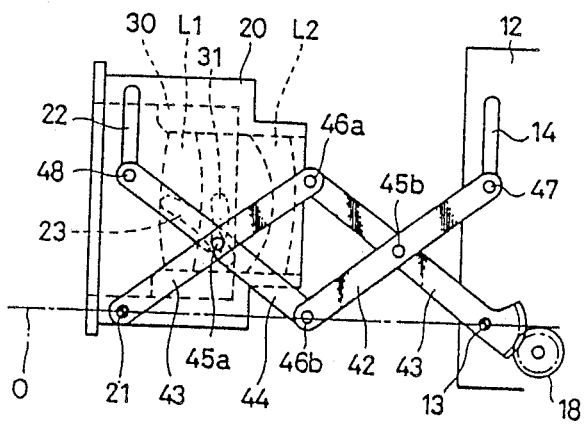
_Fig-5_

CAMERA HAVING FOCAL LENGTH ADJUSTING LENS

BACKGROUND OF THE INVENTION

1. Field of the Invention

The present invention relates to a camera having a lens assembly for adjusting a focal length and, more precisely, it relates to a mechanism for moving groups of focus adjusting lenses.

2. Description of Relates Art

In a conventional two-focus lens assembly of a known compact camera, two focuses are given by respective different lens systems. Namely, the two-focus optical system has a master lens group which moves in an optical axis direction and can not move to deviate from the optical axis, and a conversion lens group which can move to deviate from the optical axis. At one of the two focal lengths, the imaging optical system includes the master lens group only, and the imaging optical system includes both the master lens group and the conversion lens group at the other focal length. Accordingly, it is necessary to provide a plurality of conversion lens groups in order to realize three or more focal lengths in the arrangement of the two-focus lens assembly mentioned above. This results in a complicated lens construction and a complicated and large mechanism for moving the conversion lens groups. It is next to impossible to realize more than two multi-focuses by the conventional two-focus lens camera.

A zoom lens which can successively vary the focal length essentially has two pairs of variable power lenses (focal length adjusting lenses) which more close to and away from each other to successively vary the focal length. Usually, a cam ring is used to move the variable power lens assembly.

However, the known zoom lens has many precise optical elements including a cam ring, resulting in increased manufacturing cost.

SUMMARY OF THE INVENTION

Therefore the primary object of the present invention is to provide a camera having a simple and compact focus adjusting lens assembly which can provide more than two focal lengths.

To achieve the object of the invention mentioned above, the present invention provides a link mechanism which contractibly connects a camera body and a lens barrel so as to entirely move the variable power lens group and so as to vary the spatial distance between the variable power lenses.

According to the present invention, there is provided a camera having a camera body, a lens barrel which can move in the optical axis direction with respect to the camera body, a first variable power lens group which is supported so as to move in the optical axis direction with respect to the lens barrel, a second variable power lens group integrally connected to the lens barrel so as to move therewith, a linkage mechanism which contractibly connects the camera body and the lens barrel so as to change the distance therebetween, and a mechanism for moving the first variable power lens group to a predetermined position in the lens barrel in accordance with the extension and contraction of the link mechanism.

The linkage mechanism preferably comprises a pantograph linkage which can move the lens barrel in the optical axis direction without changing the position of the optical axis thereof.

The lens barrel can occupy more than two focal positions in the optical axis direction.

It is possible to provide a finder device having a finder variable power lens group which can move in the optical axis direction in association with the movement of the lens barrel in the optical axis direction.

The pantograph mechanism has a first link pivoted to the camera body, a second link pivoted to the lens barrel, third and fourth links which are rotatably connected to the first and second links to form a generally X-shape, respectively, pivot shafts which rotatably connect the front end of the first link and the rear end of the second link and rotatably connect the rear end of the fourth link and the front end of the third link, respectively, and guide means for guiding the rear end of the third link and the front end of the fourth link so as to move up and down with respect to the camera body and the lens barrel, respectively, without changing the optical axis of the lens barrel.

The first link is provided on its rear end with a sector gear having a center located on the axis of the pivot shaft between the first link and the camera body. The sector gear is in mesh with a rotatable pinion, so that the rotation of the pinion causes the lens barrel to move in the optical axis direction. The pinion can be driven by a reversible driving motor.

The pivot shaft for connecting the second link and the fourth link is preferably fitted in a cam groove which is formed in a lens frame for supporting the first variable power lens group, so that when the second link rotates, the first variable power lens group can be moved to a predetermined focal position in the optical axis direction.

The pivot shaft for connecting the second link and the fourth link is preferably inserted in an arc-like groove which is formed in the lens barrel and which has a center on the axis of the pivot shaft of the second link to be fitted in the cam groove.

Preferably, a finder driving linkage mechanism can be realized by a pantograph mechanism similar to that of the lens barrel linkage mechanism mentioned above. Namely, the finder driving linkage mechanism has a first link pivoted to the camera body, a second link pivoted to the lens barrel, third and fourth links which are rotatably connected to the first and second links to form a generally X-shape, respectively, pivot shafts which rotatably connect the front end of the first link and the rear end of the second link and rotatably connect the rear end of the fourth link and the front end of the third link, respectively, and guide means for guiding the rear end of the third link and the front end of the fourth link so as to laterally move with respect to the camera body and the lens barrel, respectively so that the lateral movement of the rear end of the third link can be converted to the linear movement of the finder variable power lens group in the optical axis direction.

The rear end of the third link and the finder variable power lens group can be connected to each other by a lever arm which can rotate about an axis located between the third link and the finder variable power lens group.

BRIEF DESCRIPTION OF DRAWINGS

The invention will be described below in detail with reference to the accompanying drawings, in which :

FIGS. 3, 4 and 5 are side elevational views of a pantograph link mechanism shown in FIG. 1, shown in different operational positions.

DETAILED DESCRIPTION OF EMBODIMENTS

Figure 1:
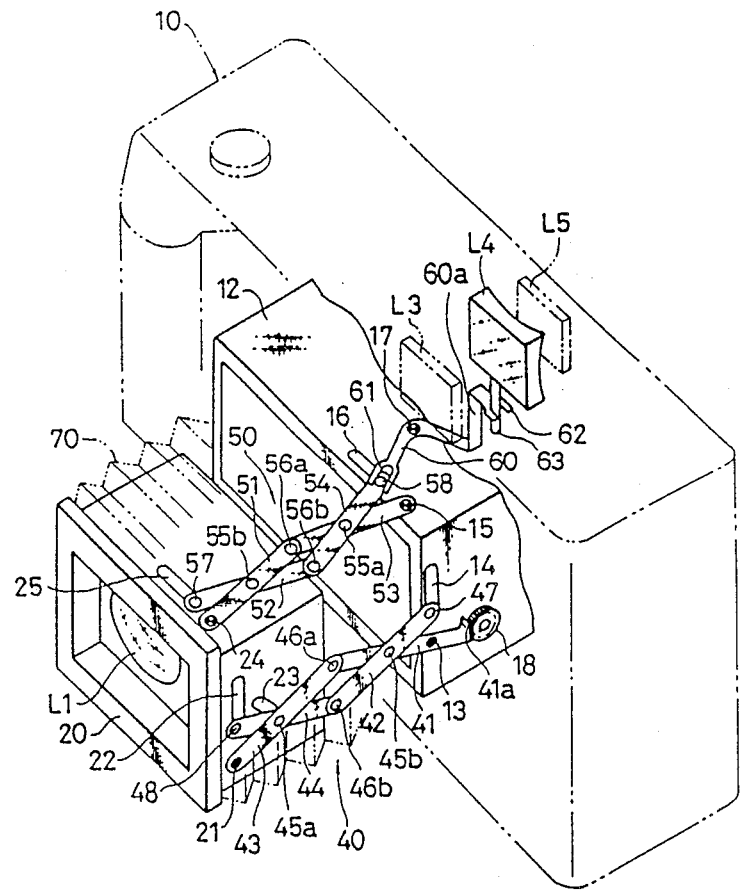
FIG. 1 is a schematic perspective view of a main part of a lens shutter type of camera to which one aspect of the present invention is applied.
Figure 2:
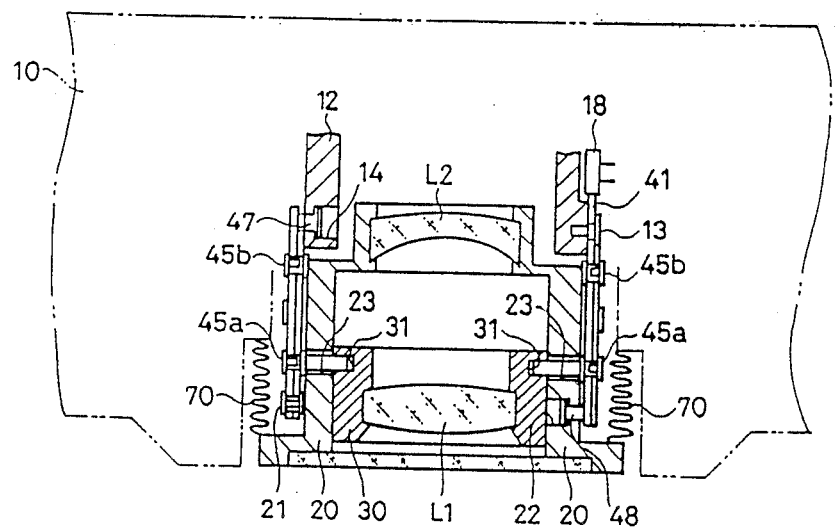
FIG. 2 is a partially sectioned bottom view of FIG. 1.

In the drawings, a camera body 10 has a parallelepiped housing 12 in the vicinity of the center front portion thereof. The housing 12 is sealed or tight from the light to prevent the entrance of a noise light other than the necessary photograhing light therein. The inner surfaces of the housing are subject to an antireflection treatment.

In front of the housing 12 is provided a lens barrel 20 which is generally parallelepiped-shaped similarly to the housing 12. the lens barrel 20 has therein groups of lenses for adjusting the focal length which will be referred to as variable power lens groups L1 and L2. The variable power lens group L1 (first variable power lens) is secured to a lens frame 30 so as to move therewith in the lens barrel 20. The lens frame 30 is supported to move in the optical axis direction in the lens barrel 20. The variable power lens L2 (second variable power lens) is secured to the rear end of the lens barrel 20 to move therewith. The lens groups L1 and L2 relatively move in the optical axis direction to move away from and toward each other in order to vary the spatial distance therebetween, thereby to vary the focal length.

Above the housing 12 are provided lenses L3, L4 and L5 of a finder optical system. The lens L3 on the object side and the eye-piece lens L5 are secured to the camera body 10 and the intermediate lens (finder variable power lens) L4 is movably supported in the optical axis direction on the camera body. The axial movement of the intermediate lens L4 causes the field magnification of the finder to change. The change of the field magnification of the finder corresponds with the change of the focal length of the photographing lens.

The mechanism for moving the first and second variable power lens groups L1 and L2 will be discussed below.

The housing 12 and the lens barrel 20 are supported by pantograph linkages 40 provided on the opposite right and left side faces thereof so as to associate with each other. Note that only the pantograph linkage 40 on one side is shown in FIG. 1. The pantograph linkage which is known per se has four links 41, 42, 43 and 44 in the illustrated embodiment. The first and third links 41 and 42 are rotatably interconnected by a pivot shaft 45b to form a generally X-shape and the second and fourth links 43 and 44 are rotatably interconnected by a pivot shaft 45a to form a generally X-shape. The front end of the first link 41 and the rear end of the second link 43 are rotatably connected to each other by a pivot shaft 46a, and the front end of the third link 42 and the rear end of the fourth link 44 are rotatably connected to each other by a pivot shaft 46b. The four pivot shafts 45a, 45b, 46a and 46b form a parallelogram, so that when the parallelogram deforms, the pantograph extends or contracts in the optical axis direction.

The first link 41 is rotatably supported by a pivot shaft 13 secured to the housing 12. The third link 42 which is pivoted to the first link 41 by the pivot shaft 45b to form a generally X-shape has a guide pin 47 at the rear end of the third link 42. The guide pin 47 is fitted in a generally vertically extending guide groove 14 which is formed in the housing 12, so that the guide pin 47 can move up and down in and along the guide groove 14. The first link 41 has at its rear end a sector gear 41a which has a enter ont he axis of the pivot shaft 13 and which is in mesh with a pinion 18. The pinion 18 is rotatably supported on the housing 12 and is driven by a driving motor M (FIG. 3) provided in the camera body 10.

Figure 3:
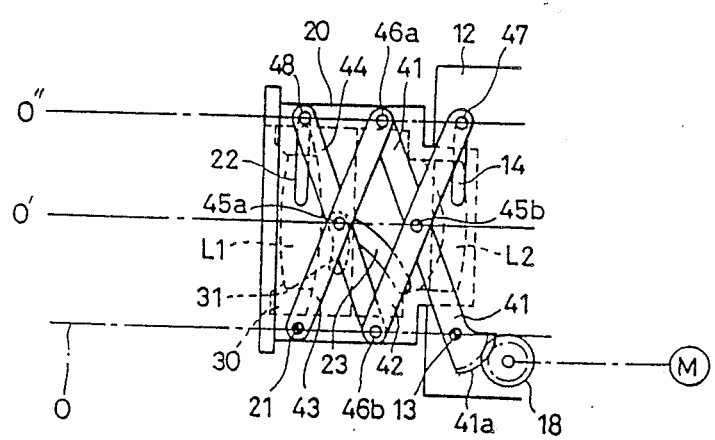

The second link 43 which is rotatably connected to the first link 41 by the pivot shaft 46a is rotatably supported by a pivot shaft 21 provided on the lens barrel 20 at the front end of the second link 43. The pivot shafts 13, 46b and 21 are placed so that they move linearly along a line O (FIG. 3) which passes the centers (axes) of these pivot shafts in accordance with the deformation (extension and contraction) of the associated pantograph linkage 40. The pivot shafts 45a and 45b, and the pivot shafts 48, 46a and 47 are placed so that the pivot shafts 45a and 45b move linearly along a line O' spaced from the parallel with the line O, and the pivot shafts 48, 46a and 47 move linearly along another line O" spaced from and parallel with the line O, respectively, in accordance with the deformation of the associated pantograph 40. Namely, the shafts 21, 46b and 13 are aligned along and on the line O, the shafts 45a and 45b along and on the line O', and the shafts 48, 46a and 47 along and on the line O", as can be seen in FIG. 3. Note that the lines O', and O" move transversely to and remain in parallel with the line O, in accordance with the deformation of the associated pantograph linkage 40.

The fourth link 44 which is pivoted to the third link 42 by the pivot shaft 46b has at its front end a guide pin 48 which is fitted in a vertically extending guide groove 22 formed in the lens barrel 20 so as to move up and down therein and therealong.

The lens frame 30 which supports the variable power lens group L1 is provided, on its outer side faces, with cam grooves 31. The lens barrel 20 is provided on its side faces adjacent to the cam grooves 31, with arc-like guide grooves 23 having centers on the axis of the pivot shafts 21. The shafts 45a extend through the guide grooves 23 to be inserted in the corresponding cam grooves 31 of the lens frame 30.

The following discussion will be directed to the finder driving link mechanism which moves the variable power finder in association with the pantograph linkages 40.

The finder driving link mechanism is composed of a pantograph linkage 50 similar to the pantographs 40 mentioned above. Namely, the pantograph linkage 50 provided between the housing 12 and the lens barrel 20 has a first link 53, a second link 51, a third link 54 and a fourth link 52. The first link 53 is pivoted to the third link 54 by a pivot shaft 55a to form a generally X-shape and the second link 51 is pivoted to the fourth link 52 by a pivot shaft 55b to form a generally X-shape. The front end of the first link 53 is pivoted to the rear end of the second link 51 by a pivot shaft 56a and the front end of the third link 52 is pivoted to the rear end of the fourth link 52 by a pivot shaft 56b. The front end of the second link 51 is pivoted to a pivot shaft 24 provided on the lens barrel 20 and the rear end of the first link 53 is pivoted to a pivot shaft 15 provided on the housing 12. The front end of the fourth link 52 and the rear end of the third link 54 have pins 57 and 58, respectively, which are fitted in corresponding guide grooves 25 and 16 which are formed in the lens barrel 20 and the housing 12, respectively.

The pin 58 which is fitted in the guide groove 16 extends upwardly, so that the upper end of the pin 58 is fitted in a forked end portion 61 of a lever arm 60. The lever arm 60 is rotatably supported on a shaft 17 provided on the housing 12. The lever arm 60 has an upwardly bent portion 60a with a bent end, i.e. a forked end portion 62 on the opposite side of the forked end portion 61. In the forked end portion 62 is fitted a pin 63 which is provided on the lower surface of the finder variable power lens (intermediate lens) L4, so that when the lens barrel 20 moves in the optical axis direction in accordance with the deformation of the pantograph linkages 40, the pantograph linkage 50 deforms (extends and contracts) in association with the deformation of the pantographs 40 to swing the third link 54 and thereby move the intermediate lens L4 in the optical axis direction through the lever arm 60.

Outside the housing 12, the lens barrel 20, and the pantograph linkages 40 and 50 is provided a bellows 70 which encloses these elements in a light tight fashion. The bellows 70 which is per se known is connected at the opposite ends thereof to the camera body 10 and the lens barrel 20, respectively, so as to extend and contract in accordance with the deformation of the pantograph linkages 40 and 50.

The apparatus of the present invention operates as follows (see particularly FIGS. 3 to 5).

When the camera is not used, the lens barrel 20 is located in the most retracted position (closest to the camera body), as shown in FIG. 3. The most retracted position corresponds to the shortest focal length position (e.g. wide angle lens).

When a variable power switch (not shown) is actuated to increase the focal length, the driving motor M rotates the pinion 18 in the clockwise direction in FIG. 3. As a result, the first link 41 rotates about the fixed shaft 13 in the counterclockwise direction to swivel the shaft 46a in the counterclockwise direction, so that the shaft 46a moves to the left (forward) in FIG. 3. As a result, the second link 43 rotates about the fixed shaft 21 in the clockwise direction to move the shaft 21 forward. Consequently, the lens barrel 20 moves forward, thus resulting in the forward movement of the variable power lens groups L1 and L2.

Furthermore, the forward movement of the lens barrel 20 causes the second link 43 and accordingly the shaft 45a to rotate about the fixed shaft 21 in the clockwise direction. As a result, the lens frame 30 which is connected to the shaft 45a through the cam groove 31 moves backward with respect to the lens barrel 20. Namely, the variable power lens group L1 comes close to the variable power lens group L2 (FIG. 4). The position shown in FIG. 4 correspond to an intermediate focal length position (e.g. standard lens).

A further rotation of the driving motor M in the same direction causes a further forward movement of the lens barrel 20, so that the variable power lens groups L1 and L2 come closest to each other (FIG. 5). This corresponds to the longest focal length position (e.g., to the telephoto lens).

When the driving motor M is reversed in FIG. 5, the focal length is changed from the longest focal length to the intermediate focal length and then to the shortest focal length.

Figure 6:
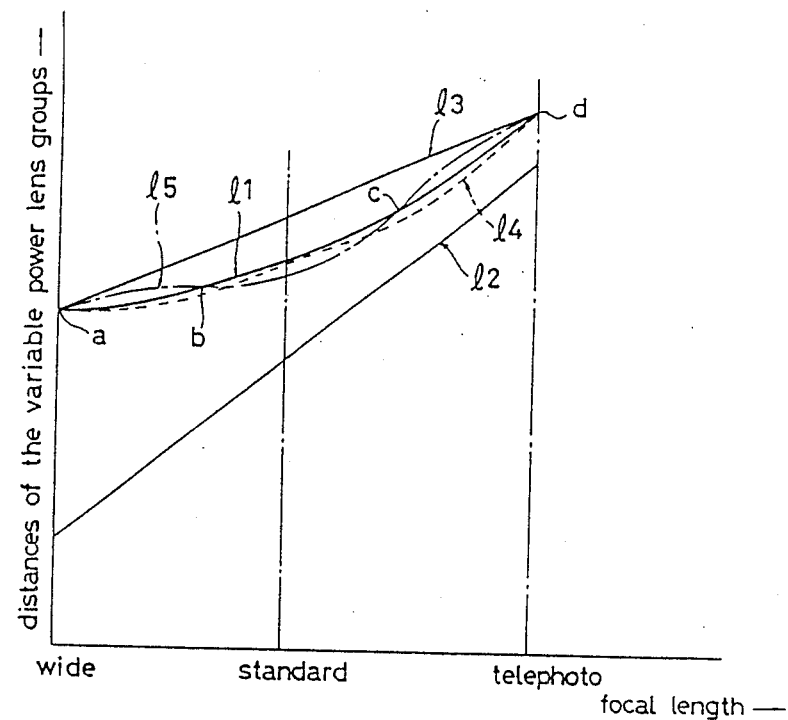
FIG. 6 is a diagram showing a relationship betwene the displacement of variable power lens groups and focal length thereof.

In the above-mentioned embodiment, the description has been directed to a three-focus lens, but the present invention is not limited thereto. FIG. 6 shows a relationship between the displacement of the variable power lens groups L1 and L2 and the focal length. In FIG. 6, the ordinate represents the distances of the variable power lens groups L1 and L2 from a film (not shown) and the abscissa represents the focal length. In FIG. 6, l1 and l2 represent ideal tracks of the travel of the variable power lens groups L1 and L2, and l3 represents the track of the travel of the variable power lens group L1 which is moved only by the pantograph linkages 40, assuming that the profiles of the cam grooves 31 are linear. Since the track l2 can be obtained only by the displacement of the lens barrel 20 in the optical axis direction, the problem to be solved is how the ideal track l1 or a track as close as possible to the ideal track l1 is realized. The solution thereto is given by the profiles of the cam grooves 31 in the illustrated embodiment, so that the variable power lens group L1 moves along a track l4 which is designated by a dotted line in FIG. 6. The track l4 comes across or close to the ideal track l1 at three points. The variable power lens groups L1 and L2 are stopped at these three points to provide wide-angle, standard, and telephoto focal lengths.

To realize a four-focus lens in the illustrated embodiment, the cam grooves 31 and the associated lens system are designed in such a way that the variable power lens group L1 moves along a track l5 which is designated by a dotted-dashed line in FIG. 6. The track l5 intersects the ideal track l1 at four points a, b, c and d. These four points correspond to the intended four focal lengths. A zoom lens in which the focal length is successively varied can be realized by properly designing the lens moving mechanism and the associated lens system, such as the profiles of the cam grooves 31 and the mounting position of the shaft 45a, so that the track of the travel of the lens group coincides with the ideal track l1 completely or within a predetermined allowable depth of focus.

With the pantograph linkages 40 of the illustrated embodiment, since the shaft 21 moves, in theory, on straight line O which is parallel with the optical axis, there is no possibility of deviation of the optical axis of the variable power lens groups L1 and L2. If the lens barrel 20 and the housing 12 are connected to relatively move in the optical axis direction by means of a male-female connector, the mechanism for supporting and moving the lens barrel 20 can be reinforced.

As can be understood from the foregoing, since the variable power lens groups are supported and actuated by the pantograph linkages, a simple and inexpensive variable focus lens in which more than two focal lengths can be provided can be easily produced. The assembly of the optical system can be also simplified according to the present invention.

I claim:

1. A camera having a focus adjusting lens assembly, comprising a camera body, a lens barrel which can move in the optical axis direction with respect to the camera body, a first variable power lens group which is supported to move in the optical axis direction with respect to the lens barrel, a second variable power lens group integrally connected to the lens barrel so as to move therewith, a deformable link mechanism which movably connects the camera body and the lens barrel so as to vary distance therebetween, and means for moving the first power lens group to a predetermined position in the lens barrel in accordance with the deformation of the link mechanism.

2. A camera having a focus adjusting lens assembly according to claim 1, wherein said link mechanism comprises at least one pantograph linkage which moves the lens barrel in the optical axis direction without changing the optical axis of the lens barrel.

3. A camera having a focus adjusting lens assembly according to claim 2, wherein said pantograph linkage comprises a first link which is pivoted to the camera body by a first pivot shaft, a second link which is pivoted to the lens barrel by a second pivot shaft, third and fourth links which are pivoted to the first and second links to form a generally X-shape, by third and fourth pivot shafts, respectively, fifth and sixth pivot shafts which rotatably connect a front end of the first link and a rear end of the second link and a front end of the third link and a rear end of the fourth link, respectively, and first and second guide means for guiding a rear end of the third link and a front end of the fourth link to upwardly and downwardly with respect to the camera body and the lens barrel, respectively.

4. A camera having a focus adjusting lens assembly according to claim 3, wherein said first pivot shaft of the first link to the camera body, said second pivot shaft of the second link to the lens barrel, and said sixth pivot shaft of the third link to the fourth link are aligned along a line parallel with the optical axis of the barrel.

5. A camera having a focus adjusting lens assembly according to claim 3, wherein said first guide means comprises a first guide pin which is provided on the rear end of the third link and a first guide groove which is provided on the camera body, said first guide pin being fittedin the first guide groove to move in and along the first guide groove.

6. A camera having a focus adjusting lens assembly according to claim 5, whereins aid second guide means comprises a second guide pin which is provided on the front end of the fourth link and a second guide groove which is provided on the lens barrel, said second guide pin being fitted in the second guide groove to move in and along the second guide groove.

7. A camera having a focus adjusting lens assembly according to claim 6, wherein said first guide pin, said second guide pin and said fifth pivot shaft of the first link to the second link are aligned on a line which extends in parallel with the optical axis and which moves in parallel with the optical axis in accordance with the deformation of the pantograph linkage.

8. A camera having a focus adjusting lens assembly according to claim 6, wherein said fourth pivot shaft between the second link and the fourth link and the third pivot shaft between the first link and the third link are aligned on a line which extends in parallel with the optical axis and which moves in parallel with the optical axis in accordance with the deformation of the pantograph linkage.

9. A camera having a focus adjusting lens assembly according to claim 6, wherein said first link is provided on its rear end with a sector gear which has a center of arc located on the axis of the first pivot shaft of the first link to the camera body.

10. A camera having a focus adjusting lens assembly according to claim 9, further comprising a rotatable pinion which is provided on the camera body to be engaged by the sector gear and a drive for rotating the pinion.

11. A camera having a focus adjusting lens assembly according to claim 9, further comprising a lens frame which carries the variable power lens groups.

12. A camera having a focus adjusting lens assembly according to claim 11, wherein said lens frame includes a cam groove in which the fourth pivot shaft between the second link and the fourth link is movably fitted, so that the first variable power lens group can be moved in the optical axis direction by the rotation of the second link.

13. A camera havaing a focus adjusting lens assembly according to claim 12, wherein said lens barrel includes an arc-like groove through which the fourth pivot shaft between the second link and the fourth link extends so as to be fitted into the cam groove of the lens frame, said arc-like groove having a center on the axis of the second pivot shaft of the second link to the lens barrel.

14. A camera having a focus adjusting lens assembly according to claim 3, wherein said second guide means comprises a second guide pin which is provided on the front end of the fourth link and a second guide groove which is provided on the lens barrel, said second guide pin being fitted in the second guide groove to move in and along the second guide groove.

15. A camera having a focus adjusting lens assembly according to claim 1, wherein said lens barrel has more than two photographing positions in the optical axis direction.

16. A camera having a focus adjusting lens assembly according to claim 1, further comprising a finder device which comprises a finder variable power lens group movable in the optical axis direction.

17. A camera having a focus adjusting lens assembly according to claim 16, further comprising a finder driving link mechanism which moves the finder variable power lens group in the optical axis direction in association with the movement of the lens barrel in the optical axis direction.

18. A camera having a focus adjusting lens assembly according to claim 17, wherein said finder driving link mechanism comprises a pantograph linkage comprising a first link which is pivoted to the camera body by a first pivot shaft, a second link which is pivoted to the lens barrel by a second pivot shaft, third and fourth links which are pivoted to the first and second links to form a generally X-shape, by third and fourth pivot shafts, respectively, a fifth pivot shaft which rotatably connects a front end of the first link and a rear end of the second link, and first and second guide means for guiding a rear end of the third link and a front end of the fourth link to laterally move with respect to the camera body and the lens barrel, respectively.

19. A camera having a focus adjusting lens assembly according to claim 18, further comprising means for converting the rear end of the lateral movement of the third link to a linear movement of the finder variable power lens group in the optical axis direction.

20. A camera having a focus adjusting lens assembly according to claim 19, wherein said converting means comprises a lever arm which operatively connects the third link and the finder variable power lens group and which is rotatably supported on a shaft locatedon the camera body.

21. A camera having a focus adjusting lens assembly according to claim 1, further comprising a bellows which contractibly connects the camera body and the lens barrel to enclose the deformable link mechanism.

22. A camera having a focus adjusting lens assembly, comprising a camera body, a lens barrel which can move in the optical axis direction with respect to the camera body, at least one pair of variable power lens groups which come close to and away from each other to vary the focal length, one of the variable power lens groups being secured to the lens barrel, the other variable power lens group being movably supported with respect to the lens barrel in the optical axis direction, contractible pantograph linkages which contractibly connects the lens barrel and the camera body, means for actuating the pantograph linkages, and cam means for operatively connecting a part of the pantograph linkages and the other variable power lens group to move the variable power lens groups relative to each other, in association with the movement of the pantograph linkages.

* * * * *

UNITED STATES PATENT AND TRADEMARK OFFICE
CERTIFICATE OF CORRECTION

PATENT NO.   : 4,894,672
DATED        : January 16, 1990
INVENTOR(S)  : H. Tanaka It is certified that error appears in the above-indentified patent and that said Letters Patent is hereby corrected as shown below:

Column 1, line 65, "link" should read--linkage--.
Column 1, line 11, "Relates" should read --Related--.
Column 1, line 34, "more" should read--move--.

Column 3, line 8, "betwene" should read--between--.
Column 3, line 17, "photograhing" should read--photographing--.

Column 4, line 63, "52" should read--54--.
Column 3, line 22, "the" should read--The--after ".";
Column 4, line 8, "enter ont he" should read--center on the --.

Column 4, line 24, "the" (first occurrence.) to read --and-- after "from";
Column 5, line 57, "correspond" to read --corresponds--.

Column 6, line 47, "bymeans" to read --by means--.
Column 7, line 1, delete "the" (second occurrence) after "with";
Column 7, line 20, insert --move--after "to";

Column 7, line 35, "fittedin" to read --fitted in--.
Column 7, line 38, "whereins aid" to read--wherein said--.
Column 8, line 63, "locatedon" to read--located on--.

Signed and Sealed this

Twenty-eighth Day of June, 1994

BRUCE LEHMAN

Attest:

Attesting Officer

Commissioner of Patents and Trademarks